United States Patent
Kopf et al.

(10) Patent No.: US 10,789,723 B1
(45) Date of Patent: Sep. 29, 2020

(54) IMAGE OBJECT EXTRACTION AND IN-PAINTING HIDDEN SURFACES FOR MODIFIED VIEWPOINT RENDERING

(71) Applicant: Facebook, Inc., Menlo Park, CA (US)

(72) Inventors: Johannes Peter Kopf, Seattle, WA (US); Brian Dolhansky, Seattle, WA (US); Suhib Fakhri Mahmod Alsisan, Bothwell, WA (US)

(73) Assignee: Facebook, Inc., Menlo Park, CA (US)

( * ) Notice: Subject to any disclaimer, the term of this patent is extended or adjusted under 35 U.S.C. 154(b) by 349 days.

(21) Appl. No.: 15/956,177

(22) Filed: Apr. 18, 2018

(51) Int. Cl.
*G06K 9/00* (2006.01)
*G06T 7/536* (2017.01)
*G06N 3/08* (2006.01)
*G06T 7/55* (2017.01)
*G06T 17/20* (2006.01)
*G06N 20/00* (2019.01)

(52) U.S. Cl.
CPC ............. *G06T 7/536* (2017.01); *G06N 3/088* (2013.01); *G06N 20/00* (2019.01); *G06T 7/55* (2017.01); *G06T 17/20* (2013.01); *G06T 2207/20081* (2013.01); *G06T 2207/20084* (2013.01)

(58) Field of Classification Search
CPC ........... G06T 7/536; G06T 7/55; G06T 17/20; G06T 2207/20084; G06T 2207/20081; G06N 20/00; G06N 3/088
See application file for complete search history.

(56) References Cited

U.S. PATENT DOCUMENTS

| | | | |
|---|---|---|---|
| 5,570,208 A * | 10/1996 | Kato | G03H 1/08 359/23 |
| 10,388,002 B2 * | 8/2019 | Ferrer | G06K 9/03 |
| 2004/0179009 A1 * | 9/2004 | Kii | G06T 15/405 345/421 |
| 2005/0231505 A1 * | 10/2005 | Kaye | G06T 7/97 345/421 |
| 2013/0021332 A1 * | 1/2013 | Ooi | H04N 13/271 345/419 |
| 2016/0012627 A1 * | 1/2016 | Kishikawa | H04N 5/272 345/419 |
| 2016/0225167 A1 * | 8/2016 | Kameyama | H04N 5/2226 |

* cited by examiner

*Primary Examiner* — Tom Y Lu
(74) *Attorney, Agent, or Firm* — Baker Botts L.L.P.

(57) ABSTRACT

In one embodiment, a method includes generating depth map for a reference image and generating a three-dimensional (3D) model for a plurality of objects in the reference image based on the depth map. The method additionally includes determining, out of the objects in the 3D model, a background object having a boundary adjacent to a foreground object. The method also includes determining that at least a portion of a surface of the background object is hidden by the foreground object and extending, in the 3D model, the surface of the background object to include the portion hidden by the foreground object. The method further includes in-paint pixels of the extended surface of the background object with pixels that approximate the portion of the surface of the background object hidden by the foreground object.

20 Claims, 7 Drawing Sheets

IMAGE OBJECT EXTRACTION AND IN-PAINTING HIDDEN SURFACES FOR MODIFIED VIEWPOINT RENDERING

TECHNICAL FIELD

This disclosure generally relates to digital image processing.

BACKGROUND

Cameras have become ubiquitous in today's technology devices. For example, most smartphones and computers contain at least one camera. The large number of cameras enable users to capture and share images, communicate through videoconferencing, scan documents, read and translate barcodes and foreign language text, authenticate with biometrics, and interact with environments through augmented reality interfaces. These cameras typically enable users to capture two-dimensional (2D) image and video content and are generally connected to processor and memory devices that enable rich image processing capabilities. For example, digital image processing techniques enable users to interactively modify digital images including robust functionality such as filtering, image editing, image restoration, cropping, adding comments, metadata and mark-up, color correction, and the like.

However, 2D image content is limited in many regards. For example, 2D images have traditionally been limited to displaying a scene from one point of view. Thus, the base image is generally limited in representing scene content to only that content that is within the line-of-sight of the camera at image capture time. For example, a 2D camera capturing a scene at a fixed reference viewpoint does not capture hidden areas behind foreground object surfaces, such as the hidden background surface (e.g., grass lawn, landscape, wall, or other background feature). Similarly, hidden surfaces of foreground objects are outside the line-of-sight of the camera at image capture time (e.g., hidden by other surfaces of a foreground object or hidden by other foreground objects). Moreover, 2D images generally lack information regarding the depth of objects in the scene. These systems are thus unable to accurately render those hidden surfaces.

However, some devices now incorporate a second primary-direction facing camera to create a dual camera system. These systems have the potential to enable additional digital image processing techniques beyond those available with single camera systems.

SUMMARY OF PARTICULAR EMBODIMENTS

In particular embodiments, a depth map is generated for each point in a reference image of a scene based on differences between corresponding pixels in the reference image and another image of the scene (e.g., the reference image and the other image may be simultaneously captured by a dual-camera device). A three-dimensional (3D) model for each of a plurality of identified objects in the reference image is then generated based on the depth map. Background and foreground objects in the 3D model can be identified, and at least a portion of a surface of the 3D model that is hidden is determined. For example, the hidden surface may belong to foreground objects (e.g., a person's side) or a background object (e.g., grass). The surface of the background object in the 3D model is extended to include the portion hidden by the foreground object. The missing, hidden, or un-rendered pixels of the extended surface of the background object are in-painted with pixels output from an algorithm, such as a machine learning algorithm, that is trained to render missing portions of known objects.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
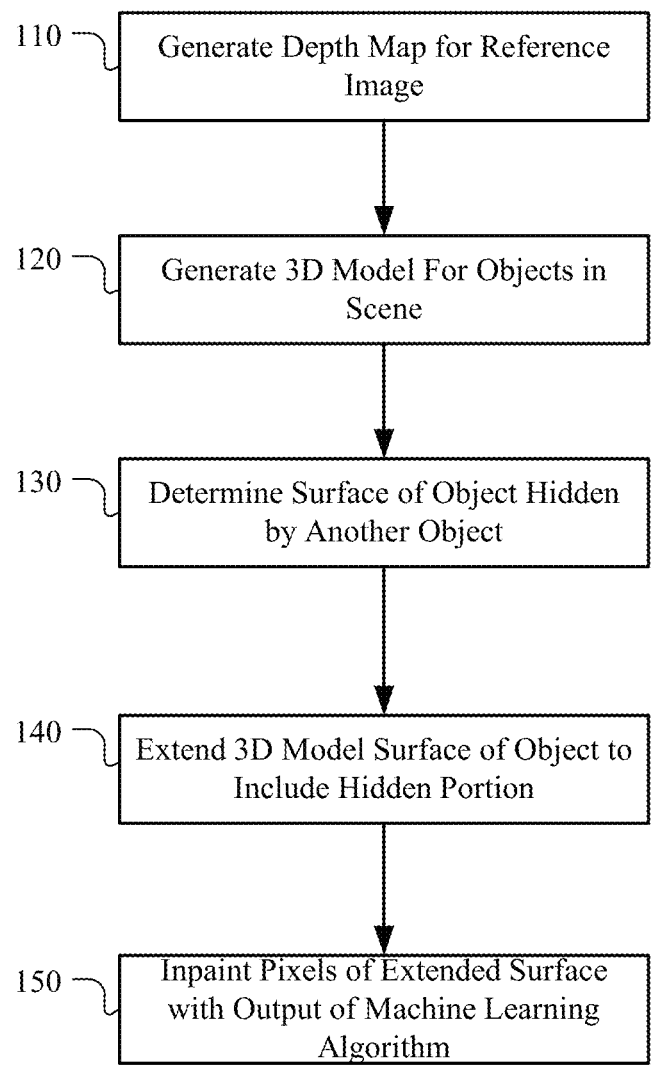
FIG. 1 illustrates an example method for image object extraction and in-painting hidden surfaces.

Certain dual camera systems enable scene interrogation processes to extract additional information from images. For example, some dual camera systems facilitate depth mapping to estimate the relative depth of each pixel of a primary image based on pixel discrepancies between two captured images. Specifically, these dual camera systems employ an image processing technique known as differential depth processing, or "depth from stereo", to create a depth map for an image. This processing technique captures two images from slightly different vantage points at the same time. Next, optical differences between the same spatial points in each image are compared to determine the depth of each pixel in the reference image. The depth information is stored as metadata for each pixel, and a depth map can be created to show the relative depth of each point in the reference image.

The increasing availability and incorporation of dual camera systems in mobile devices has increased access to depth mapping functionality for standard two-dimensional (2D) photographs. For example, now every image captured using a mobile device is a potential source of depth mapping data. However, while opportunities to access depth mapping data for photos have increased, traditional applications have failed to effectively leverage this new trove of image data.

Systems connected to multiple peripheral camera devices utilize image processing techniques to extract information from pairs or sets of captured images. For example, one such image processing technique known as differential depth processing analyzes reference images pixel by pixel to create a depth map for a primary image. In some cases, a primary image is selected as a default high resolution image that is displayed to the user by default. In particular implementations, this processing technique captures and stores two reference images from slightly different vantage points at the same time. The cameras in these dual camera systems are usually fixed in relation to each other such that the relative distance between the camera vantage points with respect to the captured 2D scene in the x-y plane is known.

For example, suppose a smartphone containing dual camera peripheral devices takes a picture of a car straight ahead (i.e., such that both cameras are facing the front of the car). The distance between the car and the smartphone is unknown. What is known, however, is the distance between the two cameras and the respective images of the car taken by the cameras. By comparing the captured image features, the system may determine which two pixels in their respective images correspond to the same spatial point in the scene. For example, the system may determine that pixel $(x_1, y_1)$ of the first image and pixel $(x_2, y_2)$ of the second image both correspond to the upper-left corner of the car's windshield. While each camera captures a slightly different image due to their differing viewpoints, the distance and positional relationship between the different viewpoints is known (e.g., the distance between the two cameras is 1 cm). Using the known geometries, the system may conceptually draw a triangle. The vertices of the base of the triangle may be the camera positions, respectively. A first line may be extended from the first camera and through the pixel $(x_1, y_1)$, and the second line may be extended from the second camera and through the pixel $(x_2, y_2)$. The point at which the two lines intersect in space may represent the physical object to which the two pixels correspond (e.g., the upper-left corner of the windshield). The point of intersection and the two camera positions form a triangle, and as such triangulation computations may be used to compute the distance between the triangle's base (which may represent the smartphone) and the object in space (e.g., the upper-left corner of the windshield). In this manner, optical differences between the same spatial points in each image are compared to determine the depth of each pixel in the reference image. Thus, the smooth hood surface of the car can also be determined to be extending into the z direction away from the camera viewpoint. Depth information for each captured pixel can be inferred or determined. The depth information is stored as metadata for each pixel, and a depth map can be created to show the relative depth of each point in the reference image.

Depth map information may enable visualization of at least some aspects of the third dimension in an image by virtually modifying the camera view point in either they x, y, or z plane after the image was taken, even though the 2D image only captured two-dimensional information. In particular embodiments, the depth map may enable a system to label certain portions of the captured image as the foreground and other portions as the background. In particular embodiments, the system may mimic the effect of changing viewpoints by moving the foreground portion of the image relative to the background portion. However, modifying the camera view point often reveals hidden surfaces not captured in the reference image. For example, imagine taking a picture of a cube against a wall. As the camera view point is modified (e.g., moving either right or left in the x direction), surfaces on the wall behind the cube are revealed due to perspective shifting. Without a priori knowledge of the background obscured by the cube at the reference viewpoint, hidden surfaces without any image information are revealed. This effect is illustrated with reference to FIGS. 2A-B and will be described in further detail below.

The teachings of the present disclosure describe solutions that estimate and project or hallucinate hidden foreground and background image surfaces to produce realistic and accurate renderings for those portions of the reference image that were obscured or hidden at the reference viewpoint. These advances allow for realistic visualization and rendering of hidden surfaces of a 2D image after post-capture user modification of a viewpoint. The results may be used to generate 2.5D images. As used herein, the term primary camera may refer to a primary (and in some cases high-resolution or higher-resolution) camera that produces a primary or reference image in a dual camera system. The primary/reference image is often the image displayed to users as representative of the image. A secondary camera refers to a second or auxiliary camera that produces a secondary image in a dual camera system. The term reference viewpoint may refer to a primary camera viewpoint at image capture time. The reference viewpoint will often be described in connection with a modification made thereto. Modifications to a reference viewpoint produce a modified or virtual viewpoint. Those viewpoints are determined after an image has already been captured. A modified or virtual viewpoint produces a modified or virtual view of the reference image.

In particular embodiments, two 2D images, referred to as a primary image and secondary image, are respectively captured with two cameras or lenses at different locations. The difference between each camera viewpoint is known or fixed relative to the 2D image space. A point in the 3D scene captured by the images (e.g., the upper-left corner of a car's windshield) may appear in both the primary and secondary images. The point in the 3D scene may, therefore, map to a particular pixel in the primary image and a particular pixel in the secondary image. For each point in the 3D scene that is captured by both images, differences in the positions of the pixels associated that point are analyzed, and depth information for the point is determined. In particular embodiments, a depth mapping is generated. The depth mapping may identify an inferred or relative depth for each point in a scene captured by a primary image and a secondary image. The depth image may be visualized by assigning a different color to each depth and rendering the depth map with each color-coded data point at its corresponding image location. In certain embodiments, the depth mapping is stored as metadata for the primary reference image.

With reference to FIG. 1, a flowchart of a method for image object extraction and in-painting hidden image surfaces is shown in reference to a non-limiting embodiment of the present disclosure. At step 110, a depth map is generated for a reference image. For example, the depth may be generated using the image processing techniques described above for a reference image and secondary image captured by a dual camera system.

Figure 2A:
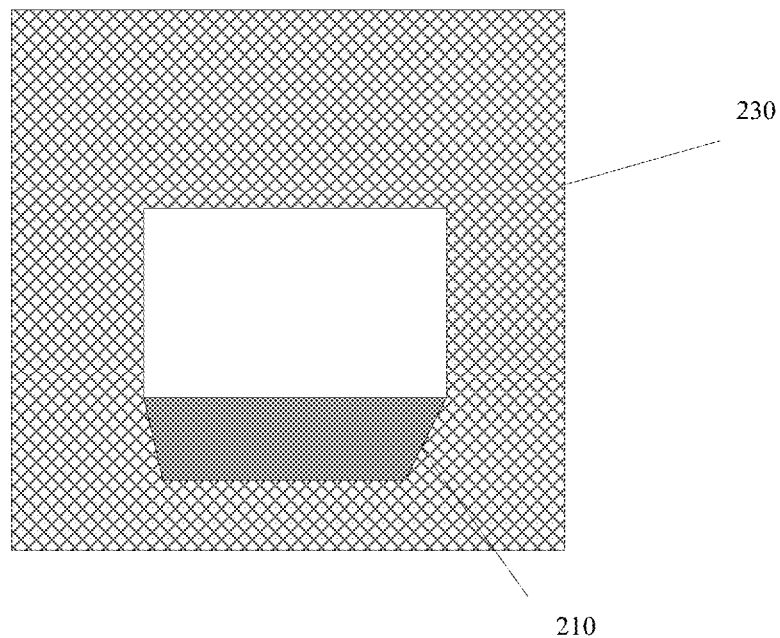
FIG. 2A illustrates an example image.

In particular embodiments, objects are identified in the reference image based on the depth map. With reference to FIG. 2A, an image of a cube 210 against a plain background surface 230 is displayed. This image was captured with a dual camera system and the displayed image serves as the primary image for this example. Depth information has been generated for each pixel in the image using the image processing techniques described above. Specifically, discrepancies between pixels in a reference image and secondary image are compared based on the different camera viewpoints that captured each respective image.

In particular embodiments, object boundaries can be delineated or inferred from sharp discrepancies between the depth information associated with nearby or adjacent pixels in a reference image (e.g., conceptually, the depth map may be overlaid on the reference image or stored in the alpha channel of the image). For example, adjacent pixels of the background 230 register with only small variations of depth discrepancies since the background object in this instance is a continuous surface. However, even a flat background object will register slight depth discrepancies, since the camera capture viewpoint is at a fixed location. In other words, a flat background will have pixels that get further away from each fixed camera view point. The pixels in the center of the background will be closer as a direct line drawn between those points and the viewpoint are shorter. Pixels at the edge of the flat background image are further away from the fixed camera viewpoint. Nevertheless, the gradient-like depth changes from image center to frame of the background object 230 are relatively small. By contrast, the change in depth between surfaces of foreground cube 210 as contrasted with background 230 is quite severe. Thus, objects can be delineated or segmented based on relative changes in the depth map.

In particular embodiments, object delineation is performed in reference to depth map information in connection with changes in reference image pixels. For example, if cube 210 was colored red and background 230 was black, pixel color changes can also be used or referenced in defining object boundaries. Other data sources may also be consulted in delineating objects from 2D images. For example, images or other information regarding known objects identified in an image can be referenced in further defining object boundaries. In the example of FIG. 2A, two objects are identified: background 230 and cube 210. In particular embodiments, cube 210 may register as several objects—namely each of the multiple surfaces of cube 210. Additional surfaces of cube 210 can be inferred although no information regarding those surfaces is present in the reference image.

With reference to FIG. 1, at step 120 a three-dimensional (3D) model is generated for objects in a reference image. The 3D mesh model may be a polygon mesh set to approximate or describe each delineated surface of each of the objects identified in the reference image. A 3D polygon mesh is a collection of vertices, edges and surfaces that define the contours of a surface of a polyhedral object in 3D computer graphics. Surfaces of an object that are consistent in depth with respect to each other (or at least relatively consistent or close) can be grouped together to form a surface that approximates their depth. The boundary of the surface may be illustrated as a single polygon in the mesh. Other nearby surfaces having similar depths are also rendered as polygons in the mesh. Thus, the 3D polygon mesh may illustrate the contours of identified objects in a reference image. In certain embodiments, the 3D polygon mesh represents the image as a continuous surface. For example, while objects identified in the images are displayed with polygon surfaces that approximate continuous object surfaces, the objects themselves are also interconnected in the 3D polygon mesh. In other words, foreground and background objects are connected in the continuous surface of the 3D polygon mesh. As another example, foreground objects that overlap other foreground objects are interconnected in the continuous 3D polygon mesh.

In particular embodiments, image recognition technology may be used to identify and label objects that appear in the image. Information regarding identified surfaces or identified objects is collected with reference to third party image databases to infer information about the identified objects. For example, an image or object database can be used to look up more information about the surfaces of cube 210. Using this approach, the system may determine that the configuration of surfaces in cube 210 matches that of other cubes. Accordingly, the system may determine that the object 210 is a cube. Information about other cubes can be referenced in order to identify additional hidden surfaces of cube 210.

This example can be extended to various other objects to gain information about the particular object depicted in the reference image. For example, a dog can be identified in the reference image. However, only information regarding the surfaces of the dog that are facing the camera lenses is captured. A machine learning algorithm can be trained to identify the captured object as a dog. Additional information regarding the object can then be imported in the image. For example, additional information regarding the shape of the dog, including surfaces that were not captured in the original image, can be inferred based on other dog objects having similar features.

In certain embodiments, object boundaries are determined with reference to a depth threshold. For example, surface boundaries in the 3D mesh model with a high degree of relative difference in depth, or a depth-difference ratio that is above a threshold level, are determined to be different objects. Thus, object surfaces corresponding to different discrete objects can be differentiated in the 3D mesh model with reference to a depth threshold. This technique enables identification of locations where the depth suddenly changes significantly with respect to the depth changes within the object or scene. For example, if d1 and d2 are the depths of two neighboring pixels, the depth-difference ratio can be evaluated as:

$$d_{change} = \max(d_1, d_2) / \min(d_1, d_2)$$

The threshold comparison can then be performed against the $d_{change}$ quantity.

With reference to FIG. 1, at step 130 objects with surfaces that are hidden by other objects are determined. In particular embodiments, foreground and background features in the 3D mesh model are identified based on the depth mapping. Objects that are obstructed by other objects can be identified, while objects that tend to obstruct other objects are also identified. These objects may be referenced as foreground and or background objects with reference to particular examples discussed in the present disclosure. However, those of ordinary skill in the art will appreciate that foreground objects may obstruct other foreground objects. Similarly, background objects may obstruct other background objects. As another example, foreground objects may obstruct background objects. For purposes of these examples, objects are identified without reference to whether the object is a foreground or background object for simplicity. For example, in complex photographs, objects may interweave and overlap with each other at different points in the reference image. The depth map is consulted in order to determine objects that are relatively closer to the viewpoint, and other objects that are farther away from the viewpoint. In particular embodiments, some areas of the image are not identified as being part of any object initially. These objects may be consolidated and considered part of a background scene and may be treated as an object for purposes of the techniques described herein. In particular embodiments, a parallax effect for the 2D image can then be rendered for the scene. In particular embodiments, the 2D image with parallax effect can be referred to as a "2.5D" representation, since only limited information is known about hidden surfaces of objects identified in the 2D reference image. Other information about hidden surfaces of objects in the image can be inferred or approximated.

In particular embodiments, foreground images may be hidden by other foreground objects. In other words, the processes described with reference to a foreground object surface hiding a background object surface are also applicable to the case where foreground objects overlap or hide other foreground object surfaces.

In particular embodiments, the parallax effect may be rendered for one or more modified or virtual camera viewpoints relative to the captured scene. For example, a user interface is displayed to a user that allows the user to move the usually fixed camera viewpoint. Of course, this is occurring after the image was taken, and no additional information about the scene is being collected when the user inputs the modified virtual camera angle. As the user moves the camera, additional information about the scene (e.g., hidden surfaces) is required in order to properly display the objects captured in the image.

Figure 2B:
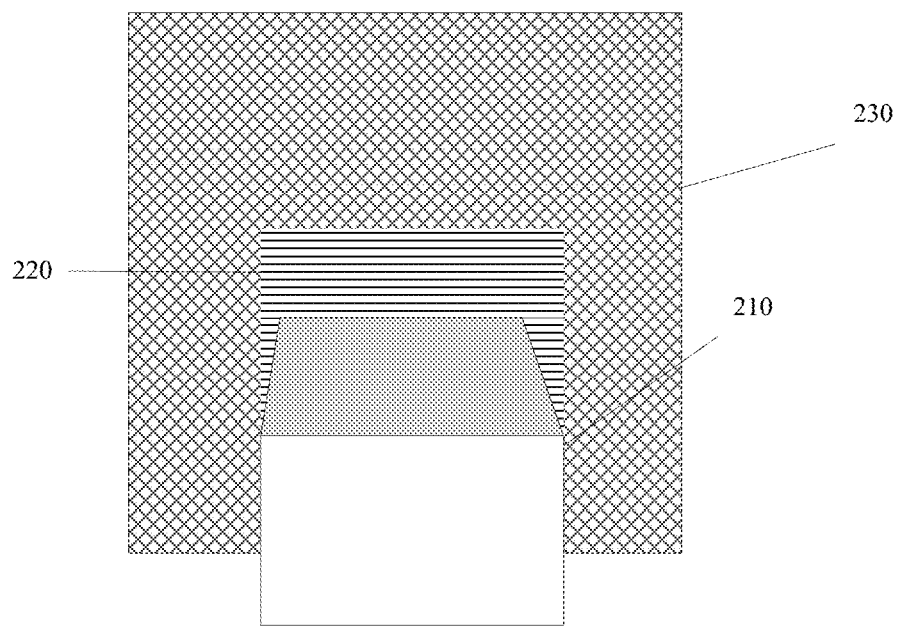
FIG. 2B illustrates an example image rendered from a modified virtual camera viewpoint with hidden surfaces from the original image revealed.

For example, FIGS. 2A and 2B show a picture of a cube 210. FIG. 2A shows the cube 210 at the original camera viewpoint when the picture was taken. FIG. 2B shows the cube when the camera viewpoint has been moved upwards in the y direction by several feet. Notice in FIG. 2A that all visible surfaces of background 230 and cube 210 are captured and displayed in the reference image. When the camera viewpoint is modified, as in FIG. 2B, hidden surfaces of the background image and cube are revealed. No information was captured for those surfaces at image capture time. For example, background 230 reveals shaded portion 220 denoted by horizontal lines that was not captured in the original reference image FIG. 2A. Additionally, the top of cube 210 was not captured in the reference image FIG. 2A.

In certain embodiments, these regions, such as region 220 in FIG. 2B, having once-hidden surface areas that are now exposed can be approximated with blurring or other image processing approximations of neighboring pixels. However, in certain instances, these approximations may leave artifacts from the 3D mesh, such as triangles and blurred pixels. Thus, the viewpoint modification process can, in some instances, produce an unrealistic effect in the final image.

In particular embodiments, one or more modifications to the virtual camera viewpoint are contemplated with reference to a primary viewpoint, and the hidden surfaces of the 3D mesh model are revealed, including once-hidden foreground and background object surfaces. At step 140 of FIG. 1, the 3D mesh model surfaces of the objects are extended to include the hidden portions. For example, the 3D mesh model may approximate the general surfaces of the hidden portions of the objects that are now revealed. In particular embodiments, depth information regarding the exposed surfaces of the object in the reference image can be used to approximate hidden surfaces. For example, in FIG. 2A, the depth of cross hatch pattern of background 230 can be used to approximate the general contour of once-hidden and now exposed portion 220. In particular embodiments, machine learning models are referenced to gather additional information regarding the shape of hidden surfaces of background 230 for approximation in the 3D mesh model.

In particular embodiments, a hallucination buffer distance is either predetermined or input and sets out a distance in image pixels that hidden surfaces should be rendered for. For example, a foreground image obscures a background image by 100 pixels in the 2D reference image. As the virtual camera viewpoint is modified (e.g., moved along the x axis of the 2D image scene), the hidden surfaces of the background feature are revealed. The hallucination buffer distance sets the number of pixels extending from the exposed surfaces for which the hidden surfaces of the background feature should be rendered.

In particular embodiments, the hallucination buffer distance is determined based on the maximum extent of exposed hidden surfaces. For example, when moving the camera viewpoint from the position in FIG. 2A to 2B, the hallucination buffer distance is determined such that it covers the exposed once-hidden area 220 of background 230, in addition to the exposed top surface of cube 210.

In particular embodiments, an image atlas, used as the texture image of the 3D mesh model, is generated based on the 3D mesh model and hallucination buffer distance for the virtual camera viewpoint. For example, starting with a pixel identified as part of a background feature, the image atlas piece for that background, referred to as one of potentially many "charts" of the image atlas, is grown or expanded to include neighboring pixels until one or more conditions is established. One condition that may cut off chart growth for an atlas chart is when the chart has encompassed a foreground feature and is determined to be growing back onto another portion of the chart piece. Another condition that may terminate chart growth is when the chart expands to cover an area that has already been covered by another chart. When a chart is terminated, a new background pixel is identified and the process repeats. Once background portions have been charted, the system moves on to pixels in foreground features, or features in a closer depth perspective. This results in a patchwork of 2D images that encompass the hidden surface areas of the image that are now revealed in response to the new virtual camera viewpoint. The atlas may include charts (pieces) that contain unrendered once-hidden surface areas of the image as governed by the hallucination buffer distance. In particular embodiments, individual pieces of an image atlas are referred to as "charts."

Figure 2C:
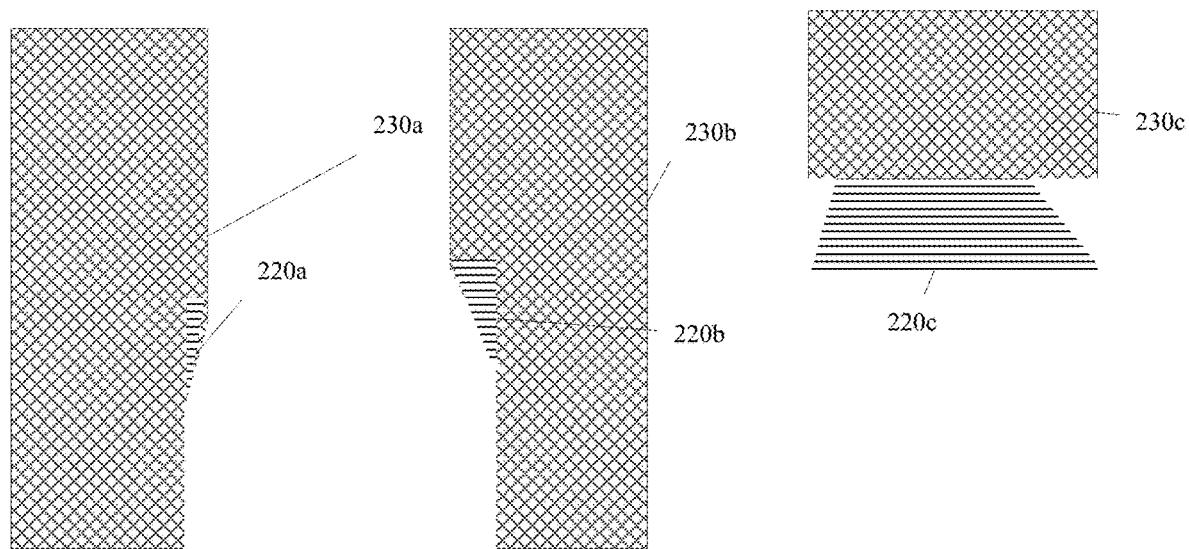
FIG. 2C illustrates an example image atlas generated from an example image.

For example, with reference to FIG. 2C, "charts" in an image atlas is displayed showing the various surface elements of background object 230 in the 3D mesh model generated from reference image FIG. 2A with the modified virtual camera viewpoint shown in FIG. 2B. Background object 230 has been cut up into 3 atlas pieces denoted by 230a-c, and accompanying once-hidden, now exposed surfaces 220a-c. Those of ordinary skill in the art will appreciate the wide variety of manners in which to divide up or cut up background object 230 into various pieces, and that those processes should not be limited to the example implementation shown in FIG. 2C. FIG. 2C also shows that atlas pieces 230a-c each contain portions of the hidden surfaces—namely 220a-c. Again, these surfaces are exposed due to the modified camera viewpoint. The perspective change to cube 210 caused hidden surfaces of background 230 to be exposed. Since no information was captured for these regions of background 230, no information is available from the reference image regarding how these surfaces should be rendered.

With reference to FIG. 1, at step 150, pixels of the extended surfaces in the charts of the atlas are in-painted with inferred pixels output from a machine learning algorithm, in accordance with particular embodiments. In particular embodiments, charts containing blank, hidden, or un-rendered surface areas are in-painted using one or more image processing techniques. For example, known image processing techniques may be applied to estimate or extend image areas into un-rendered areas. As another example, a Generative Adversarial Network (GAN) is used to in-paint un-rendered chart surfaces. In particular embodiments, the in-painting process utilizes one or more deconvolutional neural networks that are trained on large sets of training data to fill-in or in-paint missing pieces of an image. For example, in the case of a background atlas chart depicting a grassy surface with 10 square pixels of blank, un-rendered scene area, GAN in-painting may be used to estimate or extend pixel rendering to un-rendered areas of the chart. In this example, the un-rendered scene area of the chart may be in-painted to fill in a repeated or generated grass textured surface that matches that remainder of the atlas chart. In particular embodiments, depth, lighting, and other effects may be considered when in-painting or texture mapping image surfaces onto un-rendered chart areas. Thus, chart continuity may be extended by in-painting the missing surface areas of those atlas charts.

As referenced above, GAN-based in-painting or blurring techniques are used to render hidden surfaces of background objects. The specific features and advantages of such a system are described in currently pending U.S. patent application Ser. No. 15/855,583 entitled "Automatic Image Correction Using Machine Learning," which was filed on 27 Dec. 2017, the entire content of which is herein incorporated by reference in its entirety.

For example, with reference to FIG. 2C, image atlas chart 230a can be input into using a machine learning algorithm. The machine learning algorithm recognizes features of atlas chart 230a, such as texture, depth, and other information and may identify the chart piece as a portion of background object 230. For example, if background object 230 is a grassy landscape, the machine learning algorithm may identify atlas chart 230a as a portion of a grassy landscape. The machine learning algorithm may also identify missing portions of atlas chart 230a, such as portion 220a. The machine learning algorithm may be trained to recognize and in-paint missing areas of input chart pieces. In particular embodiments, the machine learning algorithm is a system of machine learning algorithms such as a GAN-based system. Thus, missing portions 220a, 220b, and 220 c can be filled in with appropriate pixels to approximate the actual content of the once-hidden but now visible surface areas.

In certain embodiments, the machine learning algorithm is trained to output adjacent image pixels corresponding to missing portions of image objects, including both foreground and background images. For example, the machine learning algorithm may output realistic adjacent image pixels for a variety of images, such as rolling grass landscapes, mountains, walls, and various other background surfaces. Those of ordinary skill in the art will appreciate the diverse set of landscapes or background surfaces that are contemplated within the scope of the present disclosure. As another example, the machine learning algorithm may output hidden surfaces of foreground objects such as the relative portions of human bodies, animals, and other objects. In certain embodiments, the machine learning algorithm is trained using training data comprising a plurality of different images of the target object. For example, a machine learning algorithm may include training data images of many varieties of grassy landscapes. The training data may offer a variety of viewpoints, light sources, shading, topography, grass length, etc. Thus, the machine learning algorithm may be trained using a wide variety of images, some of which may be similar to the conditions in the target image. The machine learning algorithm may then be able to offer realistic predictions or suggestions for continuing those surfaces for display of hidden image surface areas based on one or more of the training data images and/or inferences about the characteristics of the hidden surfaces drawn from its knowledge of other similar objects.

In particular embodiments, the in-painted atlas charts are used as the texture for the 3D mesh model to create a more realistic image for the new virtual camera viewpoint. In particular embodiments, a series of images may be constructed for any number of camera viewpoints, allowing a user to dynamically move a virtual camera viewpoint revealing hallucinated image surfaces without interruption, processing, or delay, thus creating a 3D effect for a 2D photo.

In particular embodiments, each pixel output from the machine learning model is modified according to its corresponding depth in the 3D mesh model to portray an accurate depth perspective of the object. For example, additional depth information may be realized in the 3D mesh model. The machine learning model may output, for example, pixels corresponding to a head on image of the background object 230. However, the 3D mesh model may have inferred a downward slope to background object 230 at the missing areas. Thus, the output of the machine learning model may be modified according to the depth, slope, or shape approximated by the 3D mesh model. This may affect pixel coloring, shadows, or other pixel properties. Thus, modifications to the output of the machine learning model can be used to further customize the in-painted pixels for the scene.

Figure 2D:
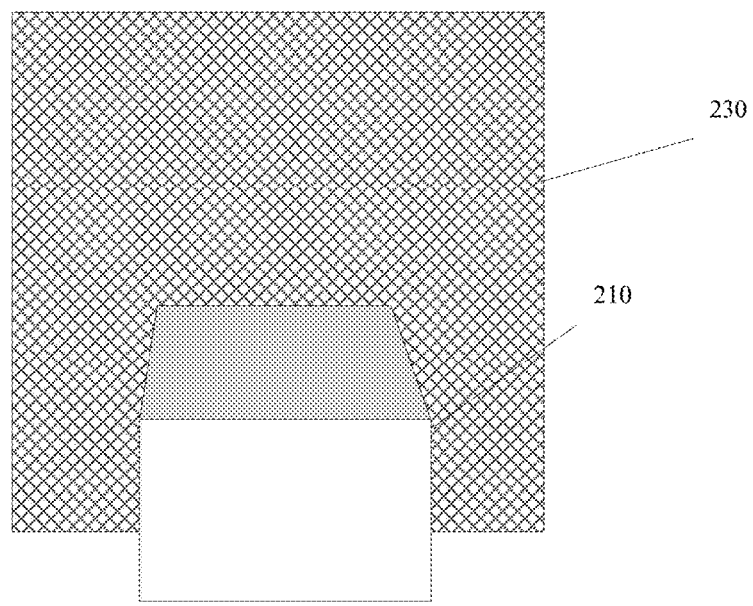
FIG. 2D illustrates an example image rendered from a modified virtual camera viewpoint with in-painted hidden surfaces.

For example, with reference to FIG. 2D, the in-painted atlas chart pieces are pieced back together (e.g., mapped onto the 3D mesh as texture) to display a virtual representation of the reference image at the new modified virtual camera viewpoint. In particular embodiments, a collection of different viewpoints can be pre-processed and stored. Thus, the user may seamlessly interact with the display device to modify the camera viewpoint and explore areas of his or her 2D photograph. For example, image processing may be conducted automatically after a photograph is taken to cover a range of modified virtual camera viewpoints.

In particular embodiments, other image processing techniques may be used to in-paint newly revealed image surfaces that were originally hidden, such as image surfaces 220a-c. For example, blurring techniques may be utilized to approximate the continued surface colors (e.g., each pixel in the hidden surface area may be estimated using nearby pixel colors). While such techniques may not approximate surface textures accurately, they are fast and do not need a machine-learning model or training data. Other known image processing techniques may also be used to in-paint newly visible surfaces. Depth information from the 3D model can be used to improve approximated or extended image surfaces.

In particular embodiments, a user interface is provided to allow users to interact and modify the virtual camera viewpoints intuitively. The user can, for example, move the camera to a new position, causing the camera viewpoint of the image to move, and displaying the newly rendered in-painted version of the reference image, such as the image displayed in FIG. 2D. As another example, the user may interact with a touch screen device by swiping to move the virtual camera viewpoint in any direction. For example, the user can swipe right to move the virtual camera viewpoint in the x direction. The user can swipe up when viewing the reference image to move the virtual camera viewpoint in the y direction. The user can zoom in at any of these positions to move the virtual camera viewpoint in the z direction. Newly rendered versions of the reference image can be rendered in accordance with the image processing techniques described herein in order to approximate and in-paint hidden surfaces with accurate depth and color information. Thus, user engagement with and enjoyment of photographs can be enhanced with these image processing techniques.

Figure 3:
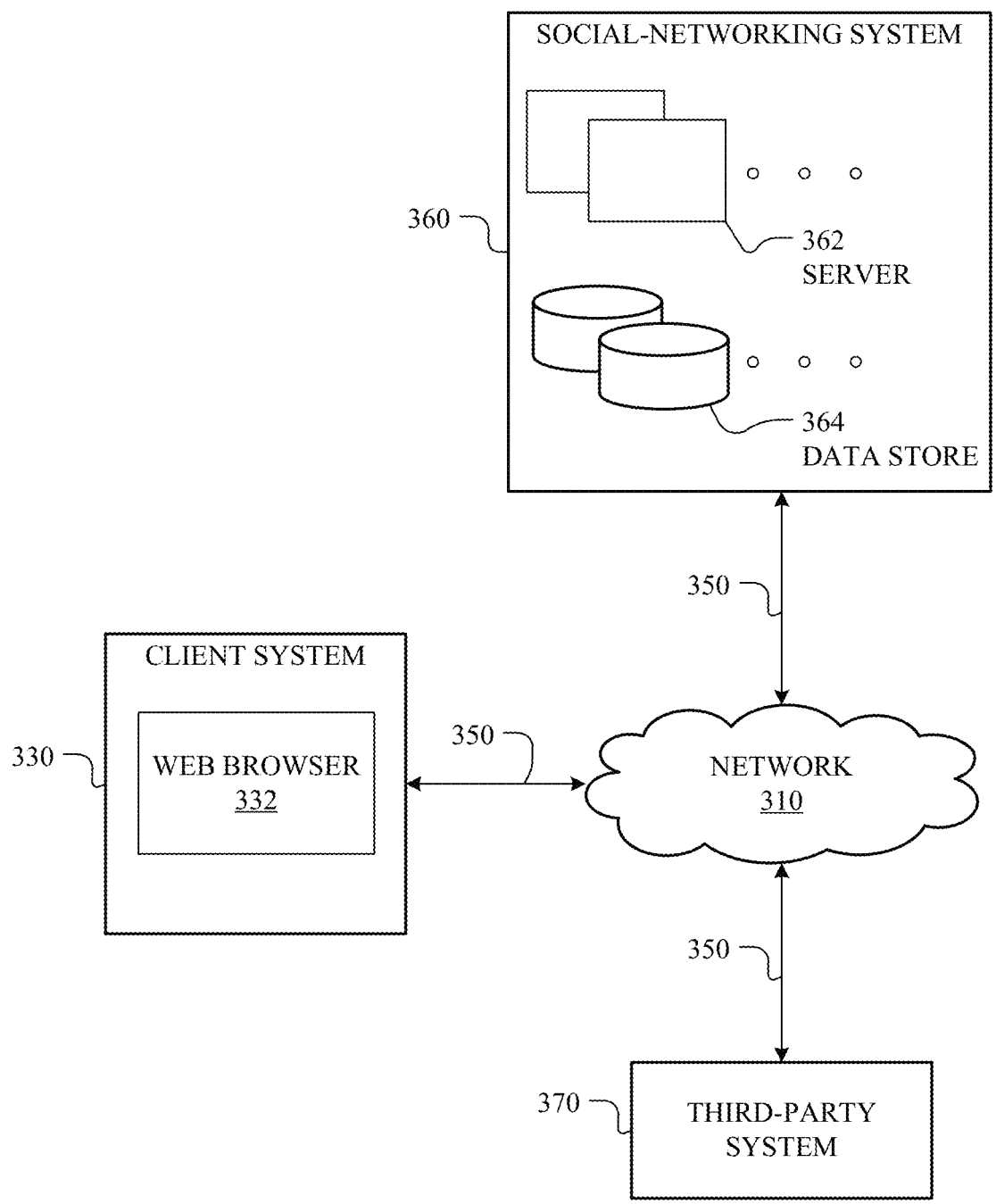
FIG. 3 illustrates an example network environment associated with a social-networking system.

FIG. 3 illustrates an example network environment 300 associated with a social-networking system. Network environment 300 includes a client system 330, a social-networking system 360, and a third-party system 370 connected to each other by a network 310. Although FIG. 3 illustrates a particular arrangement of client system 330, social-networking system 360, third-party system 370, and network 310, this disclosure contemplates any suitable arrangement of client system 330, social-networking system 360, third-party system 370, and network 310. As an example, and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of client systems 330, social-networking systems 360, third-party systems 370, and networks 310, this disclosure contemplates any suitable number of client systems 330, social-networking systems 360, third-party systems 370, and networks 310. As an example, and not by way of limitation, network environment 300 may include multiple client system 330, social-networking systems 360, third-party systems 370, and networks 310.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

In particular embodiments, client system 330 may be an electronic device including hardware, software, or embedded logic components or a combination of two or more such components and capable of carrying out the appropriate functionalities implemented or supported by client system 330. As an example, and not by way of limitation, a client system 330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 330. A client system 330 may enable a network user at client system 330 to access network 310. A client system 330 may enable its user to communicate with other users at other client systems 330.

In particular embodiments, client system 330 may include a web browser 332, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 330 may enter a Uniform Resource Locator (URL) or other address directing the web browser 332 to a particular server (such as server 362, or a server associated with a third-party system 370), and the web browser 332 may generate a Hyper Text Transfer Protocol (HTTP) request and communicate the HTTP request to server. The server may accept the HTTP request and communicate to client system 330 one or more Hyper Text Markup Language (HTML) files responsive to the HTTP request. Client system 330 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 360 may be a network-addressable computing system that can host an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. As an example, and not by way of limitation, client system 330 may access social-networking system 360 using a web browser 332, or a native application associated with social-networking system 360 (e.g., a mobile social-networking application, a messaging application, another suitable application, or any combination thereof) either directly or via network 310. In particular embodiments, social-networking system 360 may include one or more servers 362. Each server 362 may be a unitary server or a distributed server spanning multiple computers or multiple datacenters. Servers 362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 362 may include hardware, software, or embedded logic components or a combination of two or more such components for carrying out the appropriate functionalities implemented or supported by server 362. In particular embodiments, social-networking system 360 may include one or more data stores 364. Data stores 364 may be used to store various types of information. In particular embodiments, the information stored in data stores 364 may be organized according to specific data structures. In particular embodiments, each data store 364 may be a relational, columnar, correlation, or other suitable database. Although this disclosure describes or illustrates particular types of databases, this disclosure contemplates any suitable types of databases. Particular embodiments may provide interfaces that enable a client system 330, a social-networking system 360, or a third-party system 370 to manage, retrieve, modify, add, or delete, the information stored in data store 364.

In particular embodiments, social-networking system 360 may store one or more social graphs in one or more data stores 364. In particular embodiments, a social graph may include multiple nodes—which may include multiple user nodes (each corresponding to a particular user) or multiple concept nodes (each corresponding to a particular concept)—and multiple edges connecting the nodes. Social-networking system 360 may provide users of the online social network the ability to communicate and interact with other users. In particular embodiments, users may join the online social network via social-networking system 360 and then add connections (e.g., relationships) to a number of other users of social-networking system 360 to whom they want to be connected. Herein, the term "friend" may refer to any other user of social-networking system 360 with whom a user has formed a connection, association, or relationship via social-networking system 360.

In particular embodiments, social-networking system 360 may provide users with the ability to take actions on various types of items or objects, supported by social-networking system 360. As an example, and not by way of limitation, the items and objects may include groups or social networks to which users of social-networking system 360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 360 or by an external system of third-party system 370, which is separate from social-networking system 360 and coupled to social-networking system 360 via a network 310.

In particular embodiments, social-networking system 360 may be capable of linking a variety of entities. As an example, and not by way of limitation, social-networking system 360 may enable users to interact with each other as well as receive content from third-party systems 370 or other entities, or to allow users to interact with these entities through an application programming interfaces (API) or other communication channels.

In particular embodiments, a third-party system 370 may include one or more types of servers, one or more data stores, one or more interfaces, including but not limited to APIs, one or more web services, one or more content sources, one or more networks, or any other suitable components, e.g., that servers may communicate with. A third-party system 370 may be operated by a different entity from an entity operating social-networking system 360. In particular embodiments, however, social-networking system 360 and third-party systems 370 may operate in conjunction with each other to provide social-networking services to users of social-networking system 360 or third-party systems 370. In this sense, social-networking system 360 may provide a platform, or backbone, which other systems, such as third-party systems 370, may use to provide social-networking services and functionality to users across the Internet.

In particular embodiments, a third-party system 370 may include a third-party content object provider. A third-party content object provider may include one or more sources of content objects, which may be communicated to a client system 330. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 360 also includes user-generated content objects, which may enhance a user's interactions with social-networking system 360. User-generated content may include anything a user can add, upload, send, or "post" to social-networking system 360. As an example, and not by way of limitation, a user communicates posts to social-networking system 360 from a client system 330. Posts may include data such as status updates or other textual data, location information, photos, videos, links, music or other similar data or media. Content may also be added to social-networking system 360 by a third-party through a "communication channel," such as a newsfeed or stream.

In particular embodiments, social-networking system 360 may include a variety of servers, sub-systems, programs, modules, logs, and data stores. In particular embodiments, social-networking system 360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 360 may also include suitable components such as network interfaces, security mechanisms, load balancers, failover servers, management-and-network-operations consoles, other suitable components, or any suitable combination thereof. In particular embodiments, social-networking system 360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 360 to one or more client systems 330 or one or more third-party system 370 via network 310. The web server may include a mail server or other messaging functionality for receiving and routing messages between social-networking system 360 and one or more client systems 330. An API-request server may allow a third-party system 370 to access information from social-networking system 360 by calling one or more APIs. An action logger may be used to receive communications from a web server about a user's actions on or off social-networking system 360. In conjunction with the action log, a third-party-content-object log may be maintained of user exposures to third-party-content objects. A notification controller may provide information regarding content objects to a client system 330. Information may be pushed to a client system 330 as notifications, or information may be pulled from client system 330 responsive to a request received from client system 330. Authorization servers may be used to enforce one or more privacy settings of the users of social-networking system 360. A privacy setting of a user determines how particular information associated with a user can be shared. The authorization server may allow users to opt in to or opt out of having their actions logged by social-networking system 360 or shared with other systems (e.g., third-party system 370), such as, for example, by setting appropriate privacy settings. Third-party-content-object stores may be used to store content objects received from third parties, such as a third-party system 370. Location stores may be used for storing location information received from client systems 330 associated with users. Advertisement-pricing modules may combine social information, the current time, location information, or other suitable information to provide relevant advertisements, in the form of notifications, to a user.

Figure 4:
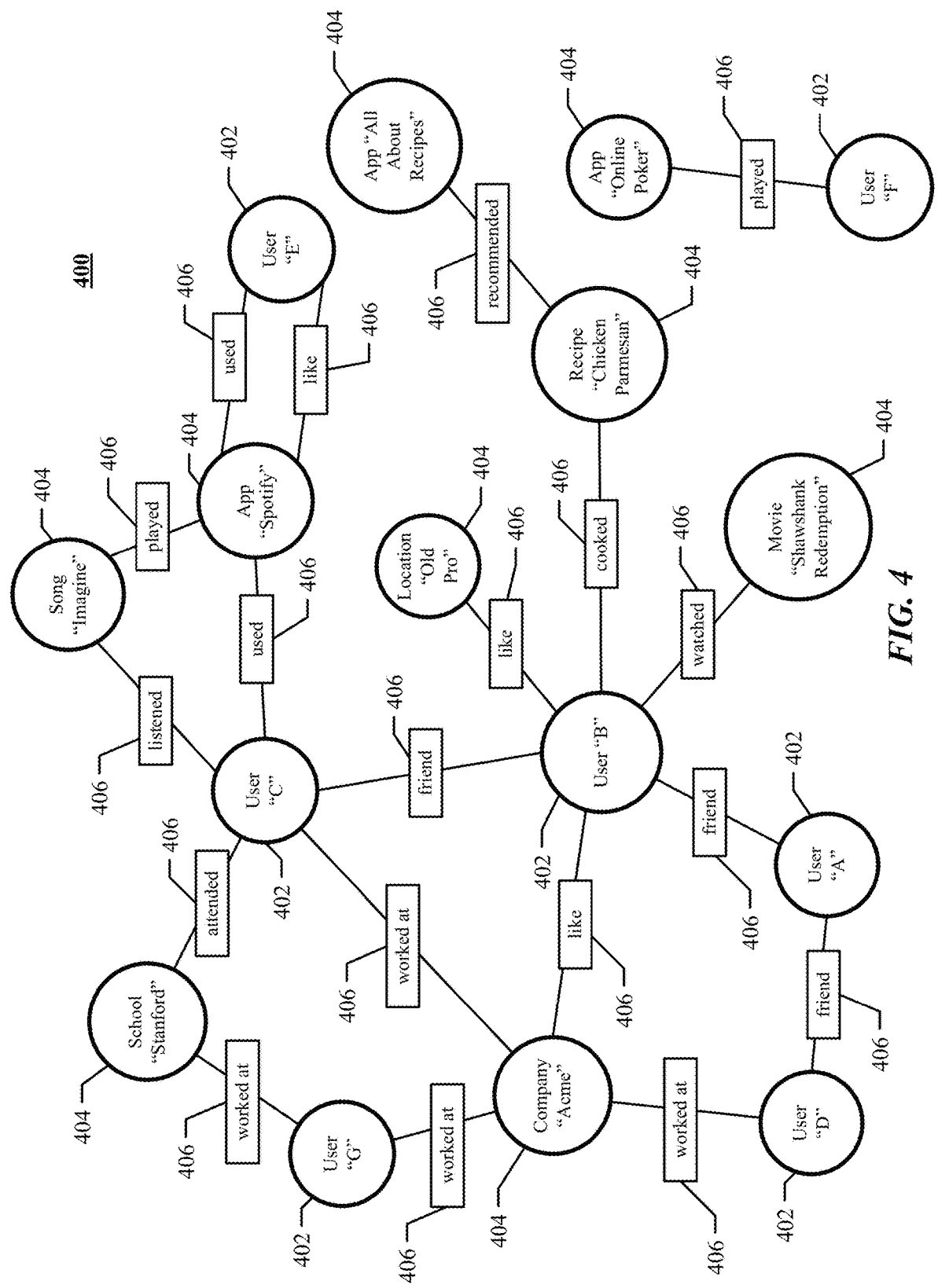
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example, and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user and store the user node 402 in one or more data stores. Users and user nodes 402 described herein may, where appropriate, refer to registered users and user nodes 402 associated with registered users. In addition, or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example, and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example, and not by way of limitation, a profile page corresponding to a particular external webpage may be the particular external webpage and the profile page may correspond to a particular concept node 404. Profile pages may be viewable by all or a selected subset of other users. As an example, and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example, and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example, and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406. The degree of separation between two objects represented by two nodes, respectively, is a count of edges in a shortest path connecting the two nodes in the social graph 400. As an example and not by way of limitation, in the social graph 400, the user node 402 of user "C" is connected to the user node 402 of user "A" via multiple paths including, for example, a first path directly passing through the user node 402 of user "B," a second path passing through the concept node 404 of company "Acme" and the user node 402 of user "D," and a third path passing through the user nodes 402 and concept nodes 404 representing school "Stanford," user "G," company "Acme," and user "D." User "C" and user "A" have a degree of separation of two because the shortest path connecting their corresponding nodes (i.e., the first path) includes two edges 406.

In particular embodiments, an edge 406 between a user node 402 and a concept node 404 may represent a particular action or activity performed by a user associated with user node 402 toward a concept associated with a concept node 404. As an example, and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example, and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example, and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

In particular embodiments, social-networking system 360 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 370 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 360 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 360 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 360 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 360 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 360 may calculate a coefficient based on a user's actions. Social-networking system 360 may monitor such actions on the online social network, on a third-party system 370, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 360 may calculate a coefficient based on the user's actions with particular types of content. The content may be associated with the online social network, a third-party system 370, or another suitable system. The content may include users, profile pages, posts, news stories, headlines, instant messages, chat room conversations, emails, advertisements, pictures, video, music, other suitable objects, or any combination thereof. Social-networking system 360 may analyze a user's actions to determine whether one or more of the actions indicate an affinity for subject matter, content, other users, and so forth. As an example, and not by way of limitation, if a user frequently posts content related to "coffee" or variants thereof, social-networking system 360 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social-networking system 360 may calculate a coefficient based on the type of relationship between particular objects. Referencing the social graph 400, social-networking system 360 may analyze the number and/or type of edges 406 connecting particular user nodes 402 and concept nodes 404 when calculating a coefficient. As an example, and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in a first photo, but merely likes a second photo, social-networking system 360 may determine that the user has a higher coefficient with respect to the first photo than the second photo because having a tagged-in-type relationship with content may be assigned a higher weight and/or rating than having a like-type relationship with content. In particular embodiments, social-networking system 360 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social-networking system 360 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 400. As an example, and not by way of limitation, social-graph entities that are closer in the social graph 400 (i.e., fewer degrees of separation) may have a higher coefficient than entities that are further apart in the social graph 400.

In particular embodiments, social-networking system 360 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 330 of the user). A first user may be more interested in other users or concepts that are closer to the first user. As an example, and not by way of limitation, if a user is one mile from an airport and two miles from a gas station, social-networking system 360 may determine that the user has a higher coefficient for the airport than the gas station based on the proximity of the airport to the user.

In particular embodiments, social-networking system 360 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 360 may provide information that is relevant to user's interests and current circumstances, increasing the likelihood that they will find such information of interest. In particular embodiments, social-networking system 360 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 360 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social-networking system 360 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 370 (e.g., via an API or other communication channel), or from another suitable system. In response to the request, social-networking system 360 may calculate the coefficient (or access the coefficient information if it has previously been calculated and stored). In particular embodiments, social-networking system 360 may measure an affinity with respect to a particular process. Different processes (both internal and external to the online social network) may request a coefficient for a particular object or set of objects. Social-networking system 360 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 5:
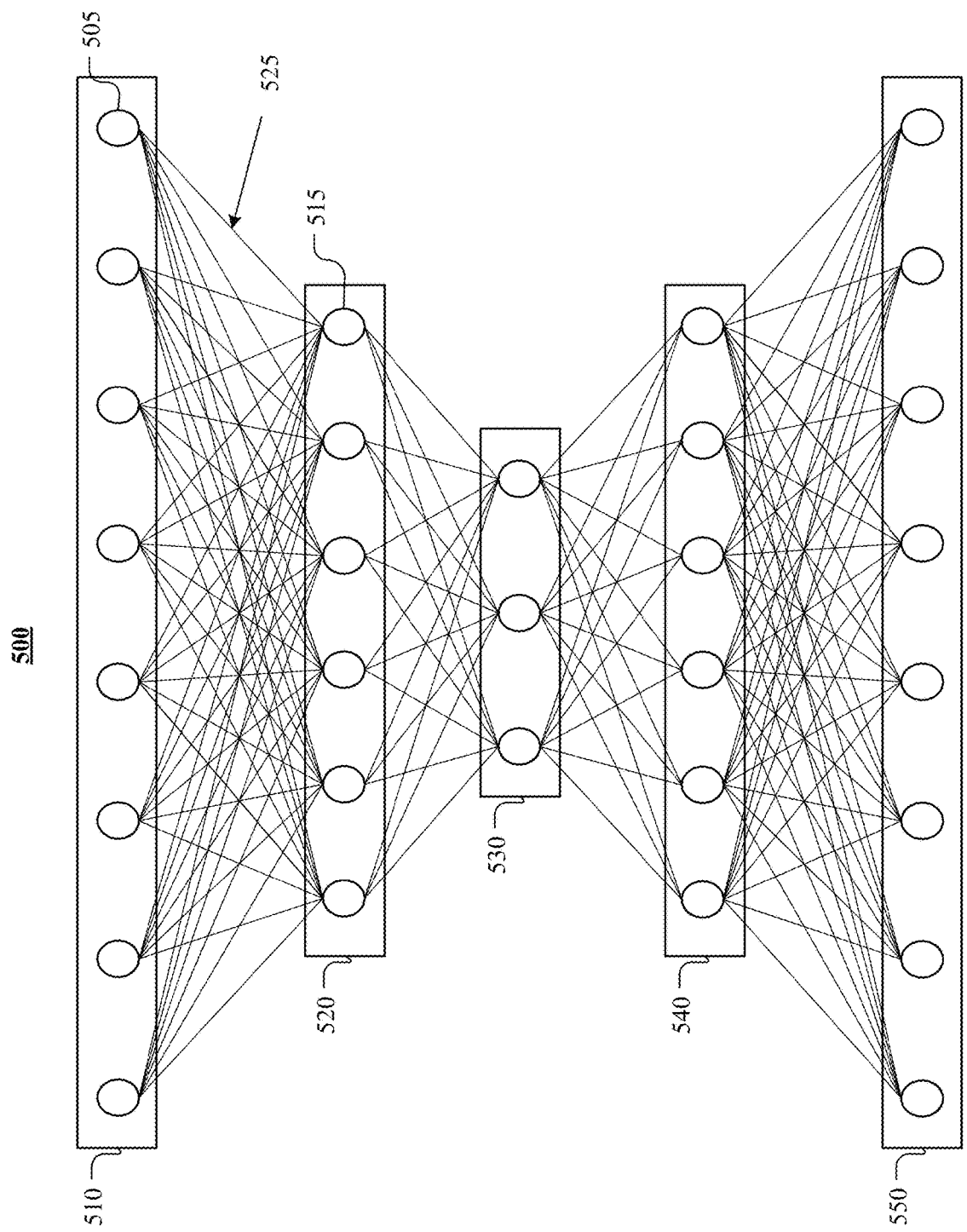
FIG. 5 illustrates an example artificial neural network.

FIG. 5 illustrates an example artificial neural network ("ANN") 500. In particular embodiments, an ANN may refer to a computational model comprising one or more nodes. Example ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example, and not by way of limitation, each node of the input layer 510 may be connected to one of more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example, and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example, and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example, and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example, and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{y_{s_k}}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example, and not by way of limitation, a connection 525 between the node 505 and the node 515 may have a weighting coefficient of 0.4, which may indicate that 0.4 multiplied by the output of the node 505 is used as an input to the node 515. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example, and not by way of limitation, training data may comprise inputs to the ANN 500 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example, and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example, and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition, or as an alternative, an advertisement may be one or more sponsored stories (e.g., a news-feed or ticker item on the social-networking system 360). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition, or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 360 may execute or modify a particular action of the user.

An advertisement may also include social-networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 360) or RSVP (e.g., through the social-networking system 360) to an event associated with the advertisement. In addition, or as an alternative, an advertisement may include social-networking-system content directed to the user. As an example, and not by way of limitation, an advertisement may display information about a friend of the user within the social-networking system 360 who has taken an action associated with the subject matter of the advertisement.

Figure 6:
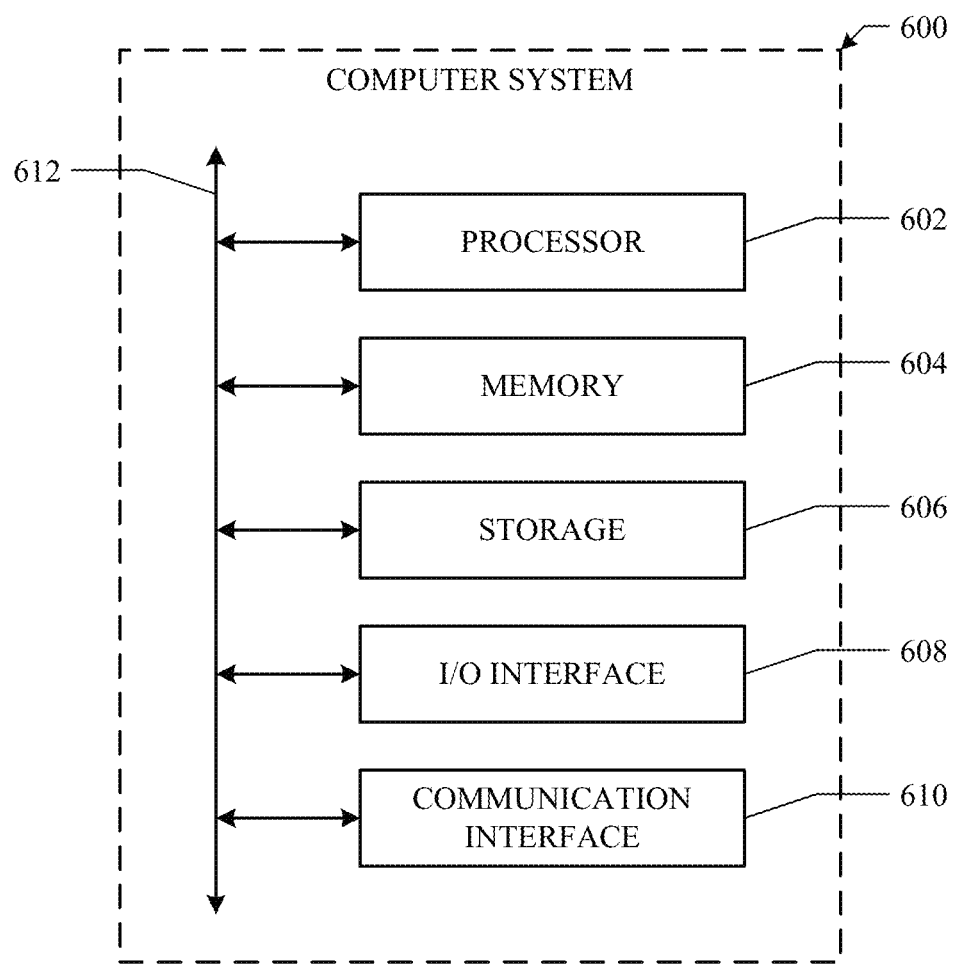
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes and illustrates particular embodiments as providing particular advantages, particular embodiments may provide none, some, or all of these advantages.

What is claimed is:

1. A method comprising:
   by a computing device, generating a depth map for points in a reference image of a scene based on differences between corresponding pixels in the reference image and another image of the scene, wherein the corresponding pixels in each image correspond to a same point in the scene;
   by the computing device, generating a three-dimensional (3D) model for a plurality of objects in the reference image based on the depth map;
   by the computing device, determining, out of the objects in the 3D model, a background object having a boundary adjacent to a foreground object;
   by the computing device, determining that at least a portion of a surface of the background object is hidden by the foreground object;
   by the computing device, extending, in the 3D model, the surface of the background object to include the portion hidden by the foreground object; and
   by the computing device, in-painting pixels of the extended surface of the background object with pixels that approximate the portion of the surface of the background object hidden by the foreground object.

2. The method of claim 1, wherein in-painting the pixels comprises in-painting the pixels with pixels output from a machine learning algorithm trained to render missing portions of known objects.

3. The method of claim 2, wherein the machine learning algorithm is trained to output adjacent image pixels corresponding to missing portions of the background object, and wherein the machine learning algorithm is trained using training data comprising a plurality of different images of objects that are similar to the background object.

4. The method of claim 1, further comprising:
   generating a new image based on a modification to a camera viewpoint from the reference image, wherein the new image includes the portion of the surface of the background object that is hidden by the foreground object in the reference image.

5. The method of claim 2, wherein the machine learning algorithm is a generative adversarial neural network.

6. The method of claim 1, wherein the reference image and the another image capture the scene from different viewpoints, and wherein the difference between the viewpoints is fixed.

7. The method of claim 1, wherein the reference image and the another image of the scene are captured at the same time by a dual camera system.

8. The method of claim 7, wherein the dual camera system is embedded in a mobile device.

9. The method of claim 1, wherein the 3D model is a polygon mesh model of each object.

10. The method of claim 1, wherein determining that at least a portion of a surface of the background object is hidden by the foreground object comprises determining that a change in the depth map for the boundary is above a threshold.

11. One or more computer-readable non-transitory storage media embodying software that is operable when executed to:
    generate a depth map for points in a reference image of a scene based on differences between corresponding pixels in the reference image and another image of the scene, wherein the corresponding pixels in each image correspond to a same point in the scene;

generate a three-dimensional (3D) model for a plurality of objects in the reference image based on the depth map;
determine, out of the objects in the 3D model, a background object having a boundary adjacent to a foreground object;
determine that at least a portion of a surface of the background object is hidden by the foreground object;
extend, in the 3D model, the surface of the background object to include the portion hidden by the foreground object; and
in-paint pixels of the extended surface of the background object with pixels that approximate the portion of the surface of the background object hidden by the foreground object.

12. The computer-readable non-transitory storage media of claim 11, wherein in-painting the pixels comprises in-painting the pixels with pixels output from a machine learning algorithm trained to render missing portions of known objects.

13. The computer-readable non-transitory storage media of claim 12, wherein the machine learning algorithm is trained to output adjacent image pixels corresponding to missing portions of the background object, and wherein the machine learning algorithm is trained using training data comprising a plurality of different images of objects that are similar to the background object.

14. The computer-readable non-transitory storage media of claim 11, further comprising:
generating a new image based on a modification to a camera viewpoint from the reference image, wherein the new image includes the portion of the surface of the background object that is hidden by the foreground object in the reference image.

15. The computer-readable non-transitory storage media of claim 12, wherein the machine learning algorithm is a generative adversarial neural network.

16. The computer-readable non-transitory storage media of claim 11, wherein the reference image and the another image capture the scene from different viewpoints, and wherein the difference between the viewpoints is fixed.

17. The computer-readable non-transitory storage media of claim 11, wherein the reference image and the another image of the scene are captured at the same time by a dual camera system.

18. The computer-readable non-transitory storage media of claim 17, wherein the dual camera system is embedded in a mobile device.

19. The computer-readable non-transitory storage media of claim 11, wherein the 3D model is a polygon mesh model of each object.

20. A system comprising:
one or more processors; and
one or more computer-readable non-transitory storage media coupled to one or more of the processors and comprising instructions operable when executed by one or more of the processors to cause the system to:
generate a depth map for points in a reference image of a scene based on differences between corresponding pixels in the reference image and another image of the scene, wherein the corresponding pixels in each image correspond to a same point in the scene;
generate a three-dimensional (3D) model for a plurality of objects in the reference image based on the depth map;
determine, out of the objects in the 3D model, a background object having a boundary adjacent to a foreground object;
determine that at least a portion of a surface of the background object is hidden by the foreground object;
extend, in the 3D model, the surface of the background object to include the portion hidden by the foreground object; and
in-paint pixels of the extended surface of the background object with pixels that approximate the portion of the surface of the background object hidden by the foreground object.

* * * * *